United States Patent
Suzuki et al.

(10) Patent No.: US 11,002,163 B2
(45) Date of Patent: May 11, 2021

(54) VALVE TIMING CONTROLLER AND VALVE TIMING CONTROL METHOD

(71) Applicant: DENSO CORPORATION, Kariya (JP)

(72) Inventors: Genki Suzuki, Kariya (JP); Tomoaki Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/718,768

(22) Filed: Dec. 18, 2019

(65) Prior Publication Data
US 2020/0200055 A1 Jun. 25, 2020

(30) Foreign Application Priority Data

Dec. 21, 2018 (JP) .............................. JP2018-239419

(51) Int. Cl.
| F01L 1/34 | (2006.01) |
| F01L 13/08 | (2006.01) |
| F02P 5/15 | (2006.01) |
| F02D 41/40 | (2006.01) |
| F01L 13/00 | (2006.01) |

(52) U.S. Cl.
CPC ............ *F01L 13/08* (2013.01); *F02D 41/401* (2013.01); *F02P 5/1506* (2013.01); *F01L 2013/113* (2013.01)

(58) Field of Classification Search
CPC ... F01L 13/08; F01L 2013/113; F02D 41/401; F02D 41/009; F02P 5/1506
See application file for complete search history.

(56) References Cited

U.S. PATENT DOCUMENTS

| 7,096,841 B2* | 8/2006 | Hattori | F02D 41/062 123/182.1 |
| 2007/0089697 A1* | 4/2007 | Hara | F02D 41/0002 123/90.15 |
| 2013/0284132 A1* | 10/2013 | Watanabe | F01L 1/34 123/90.15 |

FOREIGN PATENT DOCUMENTS

| JP | 2007-56839 | 3/2007 |
| JP | 4606473 | 1/2011 |

* cited by examiner

*Primary Examiner* — Zelalem Eshete
(74) *Attorney, Agent, or Firm* — Nixon & Vanderhye P.C.

(57) ABSTRACT

A valve timing controller for controlling a valve timing of an intake valve that opens and closes by a rotation of a camshaft to which a power is supplied from a crankshaft of an internal-combustion engine. The valve timing controller includes a phase changer changing a rotation phase for an adjustment of the valve timing; an electric actuator driving the phase changer; and a control section controlling an operation of the electric actuator, in which the control section performs a start time control process, controlling the valve timing to a rotation starter phase retarded from a preset reference phase at a start of crankshaft rotation, and controlling the valve timing to an engine started phase advanced therefrom after a passing of a top dead center in a first compression process by a piston in a cylinder after the start of crankshaft rotation and before completion of engine start.

12 Claims, 8 Drawing Sheets

VALVE TIMING CONTROLLER AND VALVE TIMING CONTROL METHOD

CROSS REFERENCE TO RELATED APPLICATION

The present application is based on and claims the benefit of priority of Japanese Patent Application No. 2018-239419, filed on Dec. 21, 2018, the disclosure of which is incorporated herein by reference.

TECHNICAL FIELD

The present disclosure generally relates to a valve timing controller.

BACKGROUND INFORMATION

In the related art, an electric valve timing controller that controls a valve timing of an intake valve of an internal-combustion engine is known. In general, in an electrically-operated valve timing controller/adjuster, it is possible to control valve timing immediately after the start of rotation of a crankshaft. In the valve timing controller of the related art, a valve timing is, for starting the internal-combustion engine, brought to a phase in between the most retarded phase and the most advanced phase, i.e., to an intermediate phase between the two, in a period from a turning ON of a starter motor of the internal-combustion engine to an engine started timing.

In the valve timing controller of the related art, after the starter motor is turned ON, there is no sufficient study regarding at which timing a phase should be changed to a position, such as a phase or angle suitable for a start of the engine. Therefore, there is room for further improvement regarding the timing of changing the phase at the start time of the internal-combustion engine.

SUMMARY

It is an object of the present disclosure to provide a valve timing controller that improves the timing of changing the phase at the start time of the internal-combustion engine.

The present disclosure is implementable in various forms. For example, the present disclosure can be realized in the form of a valve timing control method, of an internal-combustion engine system provided with a valve timing controller, and the like.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A. First Embodiment

Figure 1:
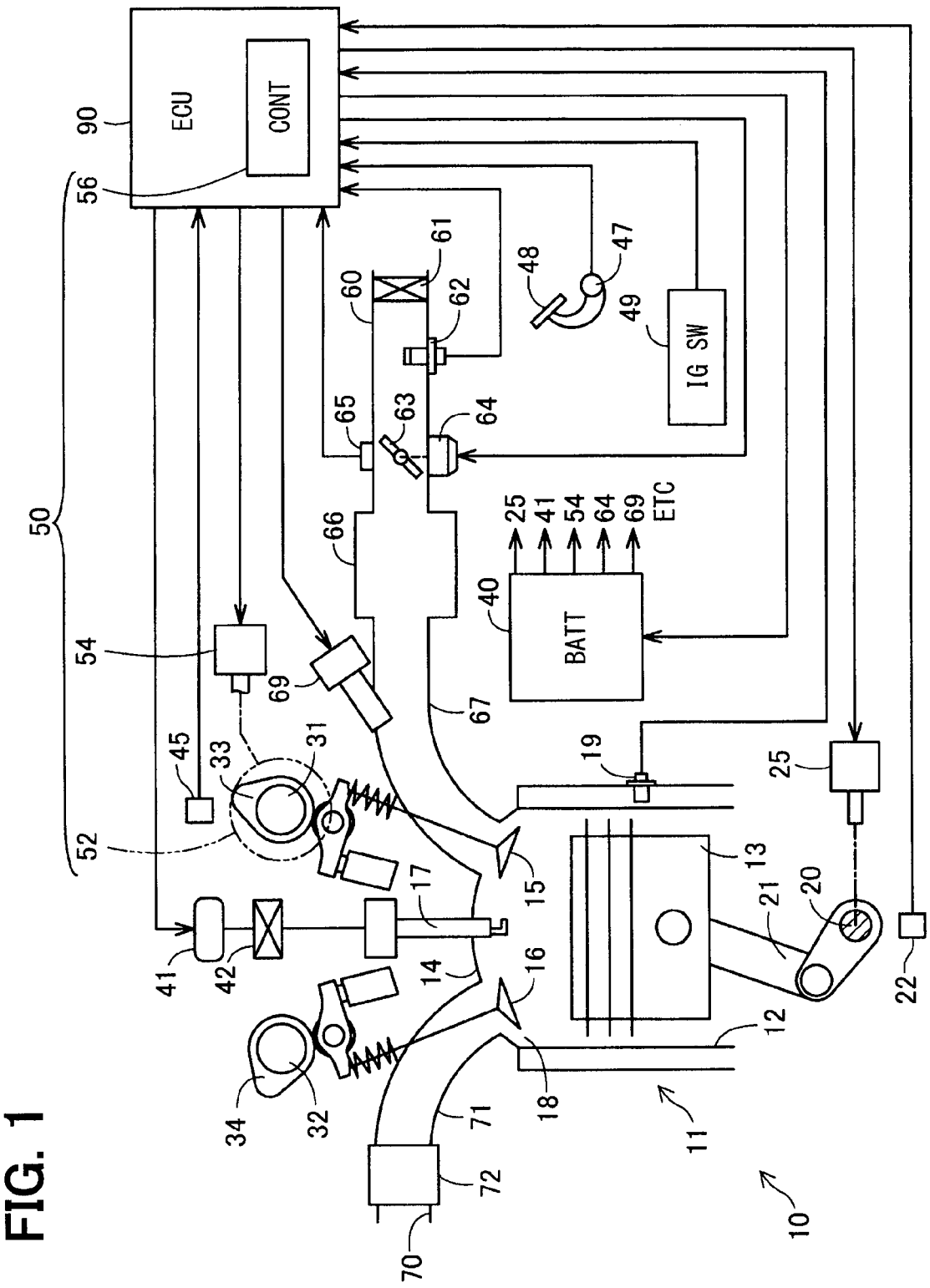
FIG. 1 is an explanatory diagram of a schematic configuration of an internal-combustion engine system provided with a valve timing controller according to a first embodiment of the present disclosure.

A-1. Device Configuration:

An internal-combustion engine system 100 shown in FIG. 1 is mounted on a vehicle (not shown) and used as a power source. The internal-combustion engine system 100 includes an internal-combustion engine 10, a battery 40, a valve timing controller 50, and an electronic control unit 90.

Figure 2:
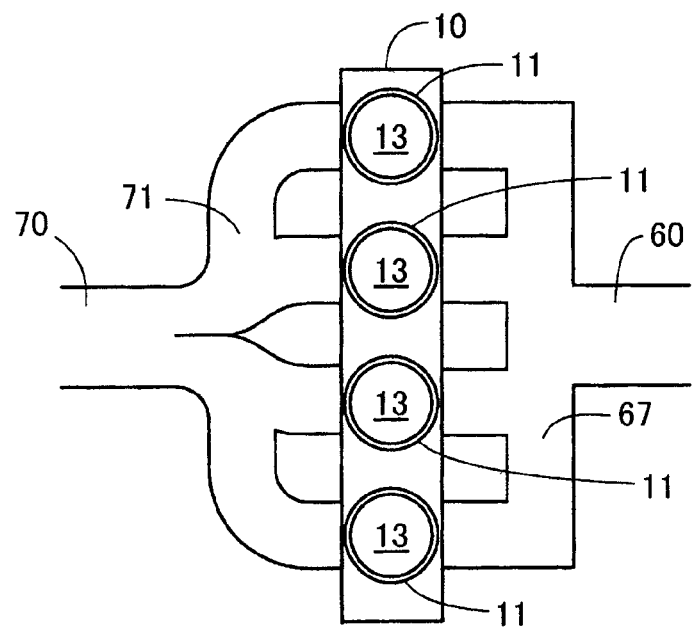
FIG. 2 is an explanatory diagram of a schematic configuration of an internal-combustion engine.

As shown in FIG. 2, the internal-combustion engine 10 is configured by an in-line four-cylinder intake port injection type engine in which four cylinders 11 are arranged in series. As shown in FIG. 1, the internal-combustion engine 10 includes a cylinder 11, a crankshaft 20, an intake camshaft 31, and an exhaust camshaft 32. In FIG. 1, for convenience of illustration, only one cylinder 11 and a pipe system connected to the cylinder 11 are shown. The internal-combustion engine 10 is connected to an intake pipe 60 and an exhaust pipe 70, respectively.

The intake pipe 60 functions as a flow passage for supplying air to the internal-combustion engine 10. An air cleaner 61, an air flow meter 62, a throttle valve 63, a surge tank 66, and an intake manifold 67 are provided in the intake pipe 60 sequentially from the upstream side. The air cleaner 61 removes foreign matter such as dust in the air. The air flow meter 62 detects the amount of intake air. The throttle valve 63 is driven by an actuator 64 such as an electric motor to adjust the opening degree, thereby adjusting the amount of intake air. The opening degree of the throttle valve 63 is detected by a throttle opening degree sensor 65. The surge tank 66 suppresses intake air pulsation. The intake manifold 67 shown in FIGS. 1 and 2 is branched to introduce air into each cylinder 11. As shown in FIG. 1, each intake manifold 67 communicates with each cylinder 11 through each intake valve 15. A fuel injection valve 69 is attached to each intake manifold 67, respectively. The fuel injection valve 69 is formed of, for example, an electromagnetically driven injector, and injects gasoline as fuel. The injected fuel is mixed with the air introduced through the intake pipe 60.

The exhaust pipe 70 functions as a flow passage for discharging the gas exhausted from the internal-combustion engine 10 (hereinafter simply referred to as "exhaust gas") to the outside of the internal-combustion engine system 100. An exhaust manifold 71 and a purification device 72 are provided in the exhaust pipe 70 sequentially from the upstream side. The exhaust manifold 71 communicates with the cylinders 11 via exhaust valves 16 to discharge the exhaust gas. The purification device 72 purifies the exhaust gas with a catalyst such as a three-way catalyst.

Each cylinder 11 provided in the internal-combustion engine 10 has a cylinder block 12, a piston 13, a cylinder head 14, the intake valve 15, the exhaust valve 16, and a spark plug 17, respectively. A space surrounded by the cylinder block 12, the piston 13 and the cylinder head 14 constitutes a combustion chamber 18. In the combustion chamber 18, a mixture of air and fuel is burned.

The cylinder block 12 is provided with a cooling water flow passage (not shown), and a cooling water temperature sensor 19 is provided. The cooling water temperature sensor 19 detects the temperature of the cooling water flowing through the cooling water flow passage as the temperature of the internal-combustion engine 10. A signal indicating the temperature detected by the cooling water temperature sensor 19 is sent to the electronic control unit 90. A piston 13 is disposed in the cylinder block 12 so as to be capable of reciprocating.

The piston 13 is connected to the crankshaft 20 via a connecting rod 21. The connecting rod 21 converts the reciprocating motion of the piston 13 into rotational motion of the crankshaft 20.

The cylinder head 14 is disposed at the top of the cylinder block 12. The cylinder head 14 is provided with the intake valve 15, the exhaust valve 16 and the spark plug 17.

The intake valve 15 opens and closes an intake port for supplying mixed gas to the combustion chamber 18. When the intake valve 15 is opened, the mixed gas is supplied from the intake manifold 67 to the combustion chamber 18.

The exhaust valve 16 opens and closes an exhaust port for discharging exhaust gas from the combustion chamber 18. When the exhaust valve 16 is opened, the mixed gas is discharged from the combustion chamber 18 to the exhaust manifold 71.

The spark plug 17 causes spark discharge in the combustion chamber 18 to ignite the mixed gas. The spark plug 17 operates based on an ignition signal from an igniter 41, and a high voltage output from an ignition coil 42 is applied thereto.

The crankshaft 20 rotates in response to the reciprocating motion of the piston 13. In the vicinity of the outer periphery of the crankshaft 20, a crank angle sensor 22 is disposed. The crank angle sensor 22 outputs a pulse signal each time the crankshaft 20 rotates by a predetermined angle. The pulse signal is transmitted to the electronic control unit 90, and is used for calculation of a crank angle which is a rotation angle of the crankshaft 20, calculation of an engine rotation speed, which is a rotation number of the crankshaft 20 per unit time, and the like. The crankshaft 20 is connected to a starter motor 25. The starter motor 25 applies a rotational force to the crankshaft 20 by cranking when the internal-combustion engine 10 is started.

The intake camshaft 31 receives torque from the crankshaft 20 and rotates. An intake cam 33 is provided on the intake camshaft 31 corresponding to each cylinder 11. Each intake cam 33 has a substantially oval cross-sectional shape, and is disposed at different angles. In response to the rotation of each intake cam 33, the intake valve 15 of each cylinder 11 is opened and closed. Therefore, the timing of the opening and closing operation of each intake valve 15 in the four cylinders 11 provided in the internal-combustion engine 10 differs from one cylinder 11 to another. A cam angle sensor 45 is disposed in the vicinity of the outer periphery of the intake camshaft 31. The cam angle sensor 45 outputs a pulse signal each time the intake camshaft 31 rotates by a predetermined angle. The pulse signal is transmitted to the electronic control unit 90. A phase changer 52 of the valve timing controller 50 described later is connected to an end of the intake camshaft 31.

The exhaust camshaft 32 receives torque from the crankshaft 20 and rotates. Exhaust cams 34 are provided on the exhaust camshaft 32 corresponding to the respective cylinders 11. Each exhaust cam 34 has a substantially oval cross-sectional shape and is disposed at different angles. In accordance with the rotation of each exhaust cam 34, the exhaust valve 16 of each cylinder 11 is opened and closed. Therefore, the timing of the opening and closing operation of each exhaust valve 16 in the four cylinders 11 provided in the internal-combustion engine 10 differs from one cylinder 11 to another.

The internal-combustion engine 10 of the present embodiment is configured as a so-called four cycle engine, which performs a series of four processes including an intake process, a compression process, an expansion process, and an exhaust process while the piston 13 reciprocates twice inside each cylinder 11, and also performs spark ignition at a timing between the compression process and the expansion process. In each process, the following operation is performed in principle.

In the intake process, the exhaust valve 16 is closed, the intake valve 15 is opened, and fuel is injected from the fuel injection valve 69. When the pressure in the combustion chamber 18 decreases as the piston 13 descends, the mixed gas is drawn from the intake pipe 60 into the combustion chamber 18. In the compression process, the intake valve 15 is closed in addition to the closure of the exhaust valve 16. Therefore, the pressure in the combustion chamber 18 rises with the rise of the piston 13, and the mixed gas is pressurized and heated. In the expansion process, ignition is performed by the spark plug 17 to ignite and burn the mixed gas. Due to the burning (i.e., combustion), the piston 13 is lowered by an application of a downward force thereto. In the exhaust process, the exhaust valve 16 is opened. Therefore, the exhaust gas generated in the combustion chamber 18 is discharged to the exhaust pipe 70 as the piston 13 rises.

The battery 40 is implemented as a lithium ion battery, and functions as one of sources of electric power in the vehicle. The lithium ion battery may be replaced with an arbitrary secondary battery such as a nickel hydrogen battery or the like.

Figure 3:
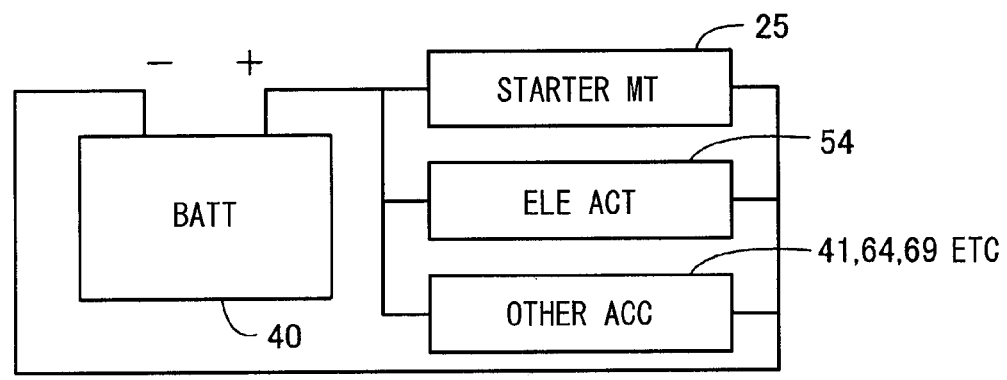
FIG. 3 is a schematic view of a connection relationship of devices connected to a battery.

As shown in FIG. 3, the battery 40 is electrically connected to the starter motor 25 and an electric actuator 54 for driving the valve timing controller 50 described later, and supplies electric power. Further, as shown in FIGS. 1 and 3, the battery 40 is electrically connected to other accessory devices mounted on the vehicle, including the actuator 64 for driving the throttle valve 63, the igniter 41, the fuel injection valve 69 and the like, for a supply of electric power. As shown in FIG. 3, the starter motor 25, the electric actuator 54 and the other accessory devices are connected in parallel, and electric power is supplied thereto from the battery 40 respectively.

The valve timing controller 50 shown in FIG. 1 controls the opening/closing timing of the intake valve 15 (hereinafter also referred to as "valve timing"). The phase of the valve timing is expressed using a crank angle (° CA). More specifically, when a bottom dead center (BDC) of the piston 13 is 0° C.A, the phase of the valve timing is represented by an amount of retardation of the timing at which the intake valve 15 closes (ABDC: After Bottom Dead Center). The valve timing in the present embodiment is either advanced or retarded in a state in which a valve opening period from a timing at which the intake valve 15 opens to a timing at which the intake valve 15 closes is held constant. The valve timing controller 50 includes a phase changer 52, the electric actuator 54, and a control section 56.

The phase changer 52 is driven by the electric actuator 54 to change the relative rotational phase of the intake camshaft 31 with respect to the crankshaft 20 to adjust the valve timing. In the present embodiment, the phase changer 52 includes a driving rotor (not shown) that rotates in conjunction with the crankshaft 20, a driven rotor (not shown) that rotates in conjunction with the intake camshaft 31, and a speed reduction mechanism (not shown). Further, the relative rotational phase between the driving rotor and the driven rotor is changed by the speed reduction mechanism. The speed reduction mechanism is provided as, for example, a planetary gear mechanism.

The electric actuator 54 drives the speed reduction mechanism of the phase changer 52. Electric power is supplied to the electric actuator 54 from the battery 40.

The control section 56 controls an operation of the valve timing controller 50 by controlling the operation of the electric actuator 54. Further, as described later, the control section 56 performs a start time control process when the internal-combustion engine 10 is started. The control section 56 is configured as part of the electronic control unit 90 provided in the internal-combustion engine system 100.

The electronic control unit 90 is a microcontroller having a CPU and a storage device, and functions as the control section 56 when the CPU executes a control program stored in advance in the storage device. Further, the electronic control unit 90 controls the operation of the internal-combustion engine system 100, including the throttle opening degree, the fuel injection amount, the timing of spark ignition and the like. Output signals are output to the electronic control unit 90 from various sensors such as the cooling water temperature sensor 19, the crank angle sensor 22, the cam angle sensor 45, the air flow meter 62, the throttle opening degree sensor 65, an accelerator sensor 47, and the like. The accelerator sensor 47 detects the amount of depression of an accelerator pedal 48 by the driver of the vehicle. Further, the electronic control unit 90 outputs a signal indicating a state such as ON/OFF of the ignition switch 49. The ON/OFF of the ignition switch 49 is switched by the driver of the vehicle, and used to start and stop the internal-combustion engine system 100.

The valve timing controller 50 according to the present embodiment is driven by the electric actuator 54, thereby, unlike the configuration driven by a hydraulic pressure, control at the time of starting the internal-combustion engine 10 is possible. Therefore, in the present embodiment, the start time control process described below is performed.

Figure 4:
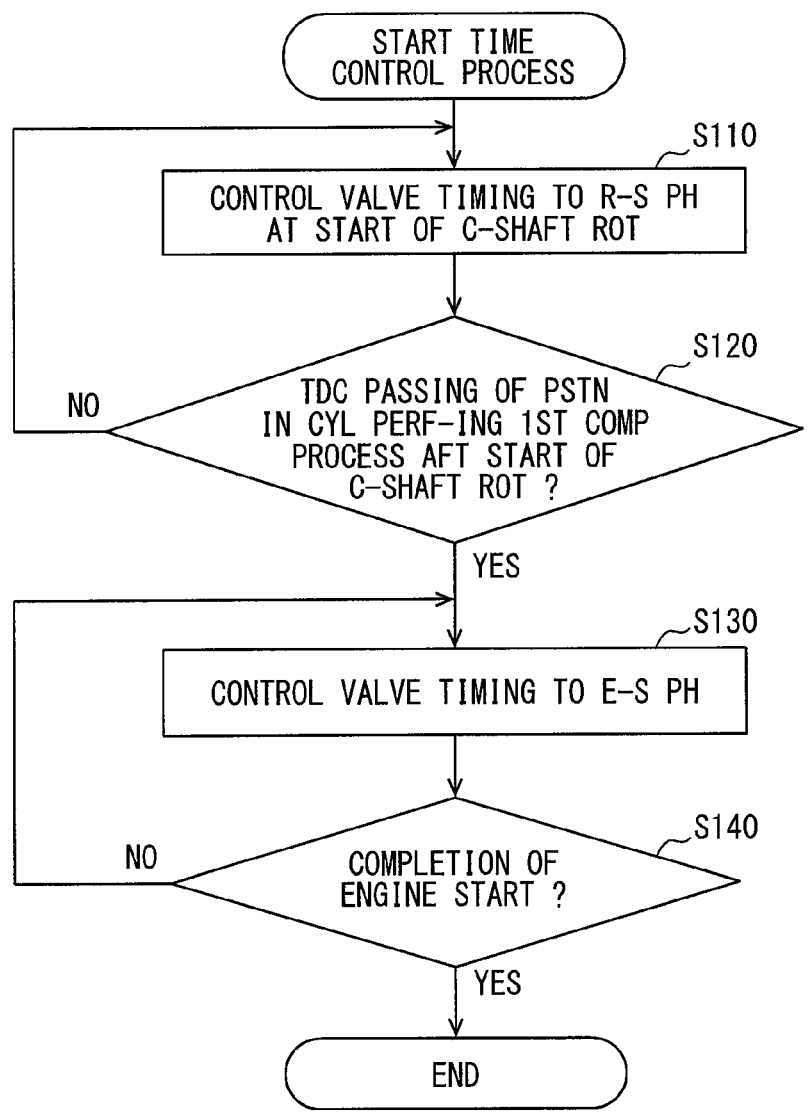
FIG. 4 is a flowchart of a procedure of a start time control process.

A-2. Start Time Control Process:

The start time control process shown in FIG. 4 is performed when the internal-combustion engine system 100 is started with the ignition switch 49 being turned ON.

The control section 56 controls the valve timing at the start of rotation of the crankshaft 20 to be set to a rotation starter phase (R-S PH) that is set as a phase having a retarded angle relative to a reference phase (step S110). In the present embodiment, the reference phase is predetermined as a phase in which the rotational phases of the crankshaft 20 and the intake camshaft 31 coincide with each other. The retarded phase means that the timing at which the intake valve 15 closes is delayed from the reference phase. Further, in the present embodiment, the rotation starter phase is set as a phase near the vicinity of the most retarded angle. The vicinity of the most retarded angle means a phase within a range of 5° C.A or less from the most retarded angle, and may be, for example, a phase at which the closing timing of the intake valve 15 is about 90° ABDC.

The reason for controlling the valve timing at the start of rotation of the crankshaft 20 to the rotation starter phase is described below. In the compression process, torque is required to raise the piston 13 while compressing the mixed gas introduced into the combustion chamber 18. In particular, when the piston 13 starts to move from a stationary state, that is, in case of starting the first compression process, a large torque is required to raise the piston 13 because the mechanical friction loss is large. Here, by setting the valve timing to a phase near the most retarded angle at the start of rotation of the crankshaft 20, the intake valve 15 is opened late, that is, toward the end of the compression process. Thus, most of the mixed gas once sucked into the combustion chamber 18 in the intake process is returned back into the intake pipe 60. That is, most of the mixed gas to be compressed as the piston 13 moves up in the compression process is returned to the intake pipe 60 without being compressed. Thus, the amount of mixed gas compressed in the compression process is reduced, and the torque required to raise the piston 13 while compressing the mixed gas is reduced, so that a so-called decompression effects can be obtained.

The control section 56 determines whether or not the piston 13 of the cylinder 11, which is a cylinder firstly performing the first compression process after the start of the rotation of the crankshaft 20, has passed the top dead center (TDC) of the first compression process (step S120). In the present embodiment, as described below, a value of the voltage applied to the terminal of the battery 40 is used to identify/determine such a timing of passing of the top dead center.

Figure 5:
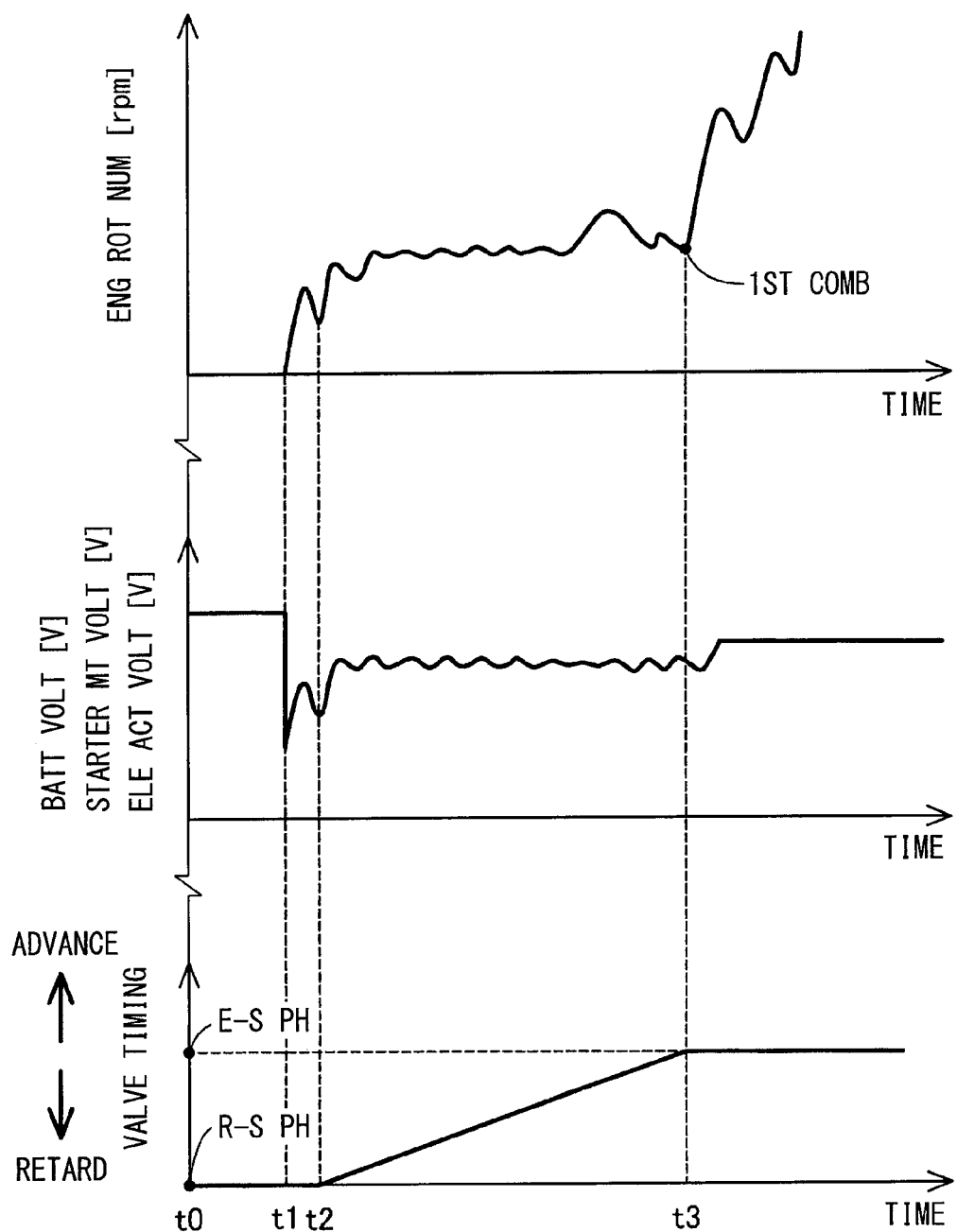
FIG. 5 is a timing chart of a relationship between an engine rotation number, a voltage and a valve timing.

In the timing chart shown in FIG. 5, the vertical axis indicates an engine rotation number (rpm), a voltage (V) applied to the terminal of the battery 40, and a valve timing, and the horizontal axis indicates time. Here, the voltage applied to the terminal of the battery 40 is equal to the voltage applied to the terminal of the starter motor 25 and the voltage applied to the terminal of the electric actuator 54 of the valve timing controller 50, respectively. Therefore, these are shown together on the vertical axis in FIG. 5. Further, the engine rotation number corresponds to the rotation number of the crankshaft 20.

Time t0 indicates time when the ignition switch 49 is turned ON. At time t0, the valve timing is controlled to the rotation starter phase set near the most retarded angle.

Time t1 indicates time when the starter motor 25 is started and the crankshaft 20 starts to rotate. The voltage applied to the terminal of the battery 40 is kept constant from time t0 to time t1, and drops sharply due to an inrush current to the starter motor 25 at time t1. When the crankshaft 20 starts to rotate at time t1, the engine rotation number increases.

Time t2 indicates time when the piston 13 of the cylinder 11, which is a cylinder firstly performing the first compression process after the start of rotation of the crankshaft 20, passes the top dead center of the first compression process. When passing the top dead center of the compression process, it is necessary to raise the piston 13 while compressing the air-fuel mixture, thereby torque is required. Therefore, when passing the top dead center of the compression process, a large current flows in the starter motor 25 and the voltage of the battery 40 is lowered. Also, the engine rotation number temporarily drops at time t2.

In step S120 shown in FIG. 4, the control section 56 determines a top dead center passing timing of the piston 13 of the cylinder 11 firstly performing the first compression process, which is the first compression process after the start of rotation of the crankshaft 20, by detecting the voltage value applied to the terminal of the battery 40. More practically, when the control section 56 detects a minimum voltage value for the second time after the start of crankshaft rotation, it is identified as the top dead center passing timing.

In the example shown in FIG. 5, the value detected at time t1 corresponds to the minimum value detected for the first time, and the value at time t2 corresponds to the minimum value detected for the second time. The minimum value detected for the second time, which may later be referred to as the second minimum value, means A minimum value (i.e., a bottom point of the downward curved graph) of the voltage detected for the second time after the start of performing the start time control process.

As shown in FIG. 4, when it is determined that the piston 13 of the cylinder 11, which is a cylinder firstly performing the first compression process after the start of rotation of the crankshaft 20, has not yet passed the top dead center of the first compression process (step S120: NO), the process returns to step S110. In other words, when the second minimum value of the voltage applied to the terminal of the battery 40 is not detected, the process returns to step S110.

On the other hand, when the second minimum value of the voltage applied to the terminal of the battery 40 is detected, thereby determining that the piston 13 of the cylinder 11, which is a cylinder firstly performing the first compression process after the start of the rotation of the crankshaft 20, has passed the top dead center (step S120: YES), the control section 56 controls the valve timing to be set to an engine started phase (E-S PH) (step S130). The engine started phase is set as an angle-advanced phase than the rotation starter phase. The angle-advanced phase means that the timing at which the intake valve 15 closes is made earlier. In the present embodiment, the engine started phase is set substantially to an intermediate phase between the most retarded phase and the most advanced phase. Note that the engine started phase is not limited to a phase approximately intermediate between the most retarded phase and the most advanced phase, but may be set to any phase having an angle-advanced phase than the valve timing at which the intake valve 15 closes at ABDC 45° C.A, for enabling the combustion of the mixed gas.

The reason for controlling the valve timing to the engine started phase after the piston 13 of the cylinder 11, which is a first one among four cylinders 11 to perform a first compression process, passes the top dead center in that first compression process is described below. When starting an operation of the internal-combustion engine 10, it is desirable to increase a compression ratio in order to facilitate combustion of the mixed gas in the combustion chamber 18. By increasing the compression ratio, the time required for combustion can be shortened thereby improving the startability of the internal-combustion engine 10. In addition, after the piston 13 of the cylinder 11, which is firstly performing the first compression process of the engine 10, passes, or manages to get over, the top dead center, the crankshaft 20 easily rotates thereafter due to inertia, and a large torque is not required to rotate the crankshaft 20. Therefore, in the present embodiment, by starting a phase advancement at a detection timing when the passage of the piston 13 of the cylinder 11 passing the top dead center (i.e., while firstly performing the first compression process) is detected, and by controlling the valve timing to be set to the engine started phase that has an angle-advanced phase than the engine started phase, it is possible to prevent the deterioration of startability while reducing the torque required for the rotation of the crankshaft 20. Further, by controlling the valve timing to the engine started phase, the emission at the start time of the internal-combustion engine 10 can be reduced.

In the present embodiment, as shown in FIG. 5, the control section 56 starts advancing at time t2 when top dead center passage is detected, and gradually advances the valve timing to the engine started phase in a period between time t2 and time t3. Here, time t3 indicates a timing of a first combustion of the internal-combustion engine 10. The first combustion of the internal-combustion engine 10 means a timing at which the combustion in at least one cylinder 11 of the plurality of cylinders 11 of the internal-combustion engine 10 has started. Note that the valve timing may either be gradually, or stepwise, or steeply advanced from the rotation starter phase to the engine started phase in a period between time t2 and time t3.

As shown in FIG. 4, the control section 56 determines whether a starting or a start operation of the internal-combustion engine 10 has been completed (step S140). The completion of engine start of the internal-combustion engine 10 corresponds to a combustion complete state in which the internal-combustion engine 10 is completely (e.g., continuously, and smoothly, in other words) combusting, which may be characterized as an engine start completion timing. The complete, continuous and smooth combustion of the internal-combustion engine 10 means a state in which the internal-combustion engine 10 can operate independently, indicating that no assistance by the starter motor 25 is required, for the operation (i.e., rotation) of the internal-combustion engine 10. In the present embodiment, the engine rotation number is used to determine whether the start of the internal-combustion engine 10 is complete. More specifically, it is determined that the start of the internal-combustion engine 10 is complete when the engine rotation number is equal to or greater than a predetermined value for a predetermined time or more. For example, the completion of engine start may be determined based on an amount of change of the engine rotation number and required time for such change, which may be derived from an increase ratio of the engine rotation number or the like, or may be determined based on an acceleration or an angular acceleration, which may be derived from a time difference for rotating the crankshaft 20 for a certain rotation angle.

When it is determined that the start of the internal-combustion engine 10 is not complete (step S140: NO), the process returns to step S130. In such case, as shown in FIG. 5, the engine started phase is maintained after time t3. On the other hand, as shown in FIG. 4, when it is determined that the start of the internal-combustion engine 10 is complete (step S140: YES), the control section 56 ends the start time control process and performs a normal valve timing control process. The normal valve timing control process means a control process of valve timing other than the start time of the internal-combustion engine 10, in which the valve timing is controlled to a target phase that is set according to an operating condition of the internal-combustion engine 10 based on the detection result of the accelerator sensor 47 or the like.

According to the valve timing controller 50 of the first embodiment described above, the valve timing at the start of rotation of the crankshaft 20 is controlled to the rotation starter phase that is set as an angle-retarded phase than the reference phase, and, valve timing is adjusted to the engine started phase that is set as the angle-advanced phase relative to the rotation starter phase, when one cylinder 11 from among the plurality of cylinders 11 in the internal-combustion engine 10 firstly performs a compression process, which may more specifically be a timing after the first passing of the top dead center by the piston 13 in that cylinder performing the first compression process. Therefore, the torque required for the rotation of the crankshaft 20 for raising the piston 13 is reduced, as compared with the configuration in which adjustment to the engine started phase is performed before passing the top dead center of the first compression process after the start of rotation of the crankshaft 20. Further, by controlling the valve timing to the engine started phase, the emission at the start time of the internal-combustion engine 10 can be reduced. In addition, when the temperature of the internal-combustion engine 10 is in a low temperature state, the compression ratio of the mixed gas in the combustion chamber 18 can be increased by controlling the valve timing to the engine started phase, thereby the time required for combustion can be shortened, and deterioration of the startability of the internal-combustion engine 10 can be prevented. Therefore, while reducing the torque required for the rotation of the crankshaft 20, it is possible to prevent a failure at the start time of the internal-combustion engine 10. Thus, the phase change timing at the time of starting the internal-combustion engine 10 can be improved.

In addition, since the rotation starter phase is set as a phase close to the most retarded phase, in the first compression process, the intake valve 15 is opened to a latest timing (i.e., for a longer period of time, in other words), and the mixed gas once drawn into the combustion chamber 18 in the intake process is mostly returned back to the intake pipe 60. Thus, the amount of the mixed gas compressed in the first compression process decreases, and the torque required to raise the piston 13 while compressing the mixed gas can be further reduced.

Further, by utilizing the value of the voltage applied to the terminal of the battery 40 for supplying electric power to the starter motor 25, the passing of the top dead center of the piston 13 in one cylinder 11 firstly performing the first compression process among the four cylinders in the engine 10, which is also firstly performing the compression process, is determinable. Further, since the value of the voltage applied to the terminal of the battery 40 is used, the timing of such top dead center passing can be directly determinable, which prevents a deterioration of the detection accuracy of such timing.

Further, the timing at which the second minimum value of the voltage applied to the terminal of the battery 40 is determined as a timing of such top dead center passing, thereby deterioration of the determination accuracy is preventable due to the clarity of reference timing.

B. Second Embodiment

Figure 6:
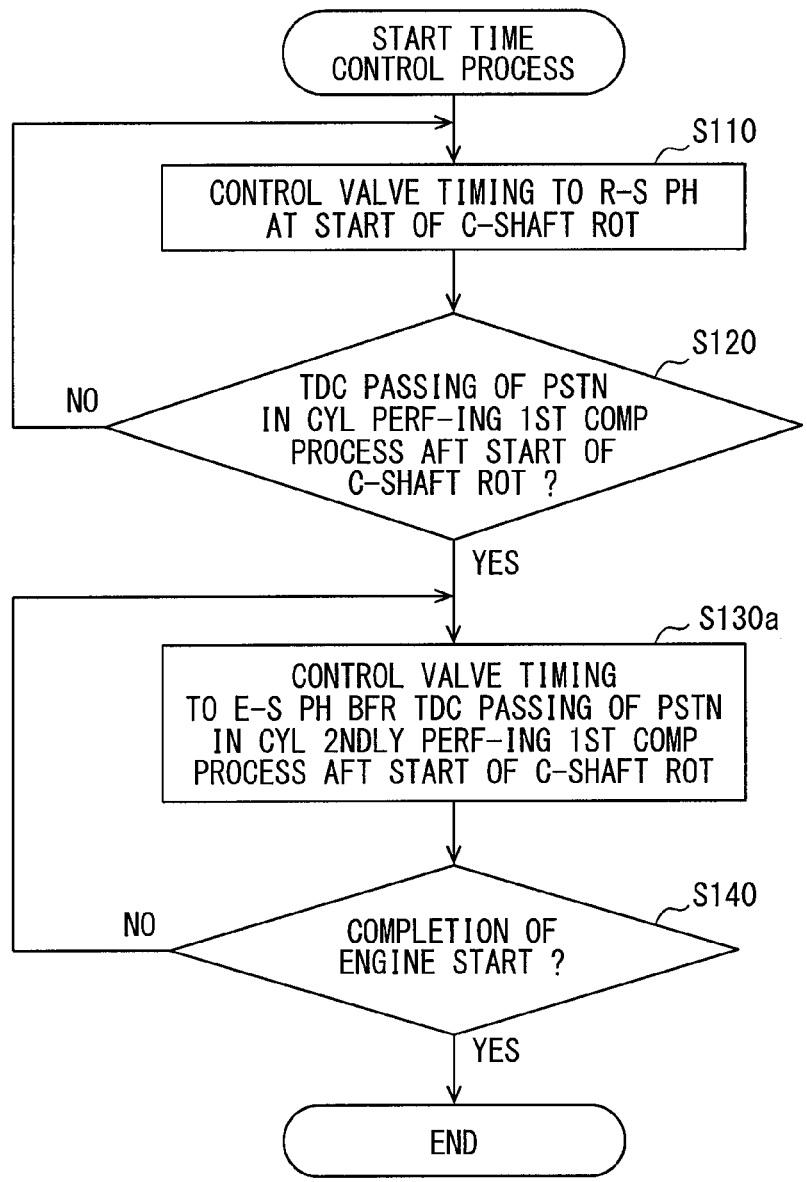
FIG. 6 is a flowchart of the procedure of the start time control process in a second embodiment of the present disclosure.

In the start time control process performed by the valve timing controller 50 according to the second embodiment shown in FIG. 6, step S130*a*, which is different from the control process of step S130 in the first embodiment, is performed. The other configuration including the device configuration is the same as that of the valve timing controller 50 of the first embodiment, which means that the same configuration has the same reference numeral and the detailed description thereof is omitted.

As shown in FIG. 6, when it is determined that the piston 13 of the cylinder 11 firstly performing the first compression process after the start of rotation of the crankshaft 20 passes the top dead center (step S120: YES), the process proceeds to S130*a*.

Figure 7:
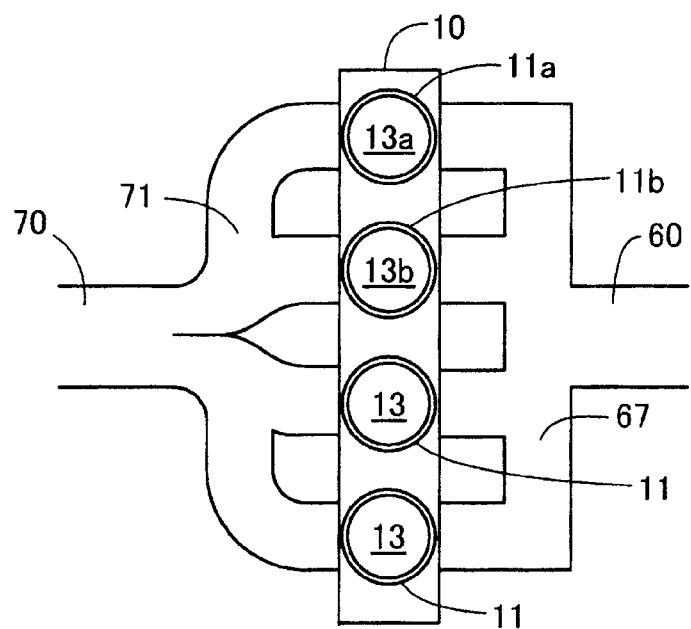
FIG. 7 is an explanatory diagram of cylinders regarding which one of the cylinders has a compression process first, and which one has the compression process secondly.

As shown in FIG. 7, in the following description, the cylinder 11 that firstly performs a compression process among the four cylinders after the start of rotation of the crankshaft 20 is also referred to as a first cylinder 11*a* and the piston 13 disposed in the first cylinder 11*a* is also referred to as a first piston 13*a*. Further, the cylinder 11 that secondly performs a compression process among the four cylinders after the start of rotation of the crankshaft 20 is also referred to as a second cylinder 11*b*, and the piston 13 disposed in the second cylinder 11*b* is also referred to as a second piston 13*b*.

As shown in FIG. 6, the control section 56 controls the valve timing to the engine started phase (step S130*a*), before a timing at which the second piston 13*b* in the second cylinder 11*b* secondly performing a compression process after the start of the rotation of the crankshaft 20 passes the top dead center.

Figure 8:
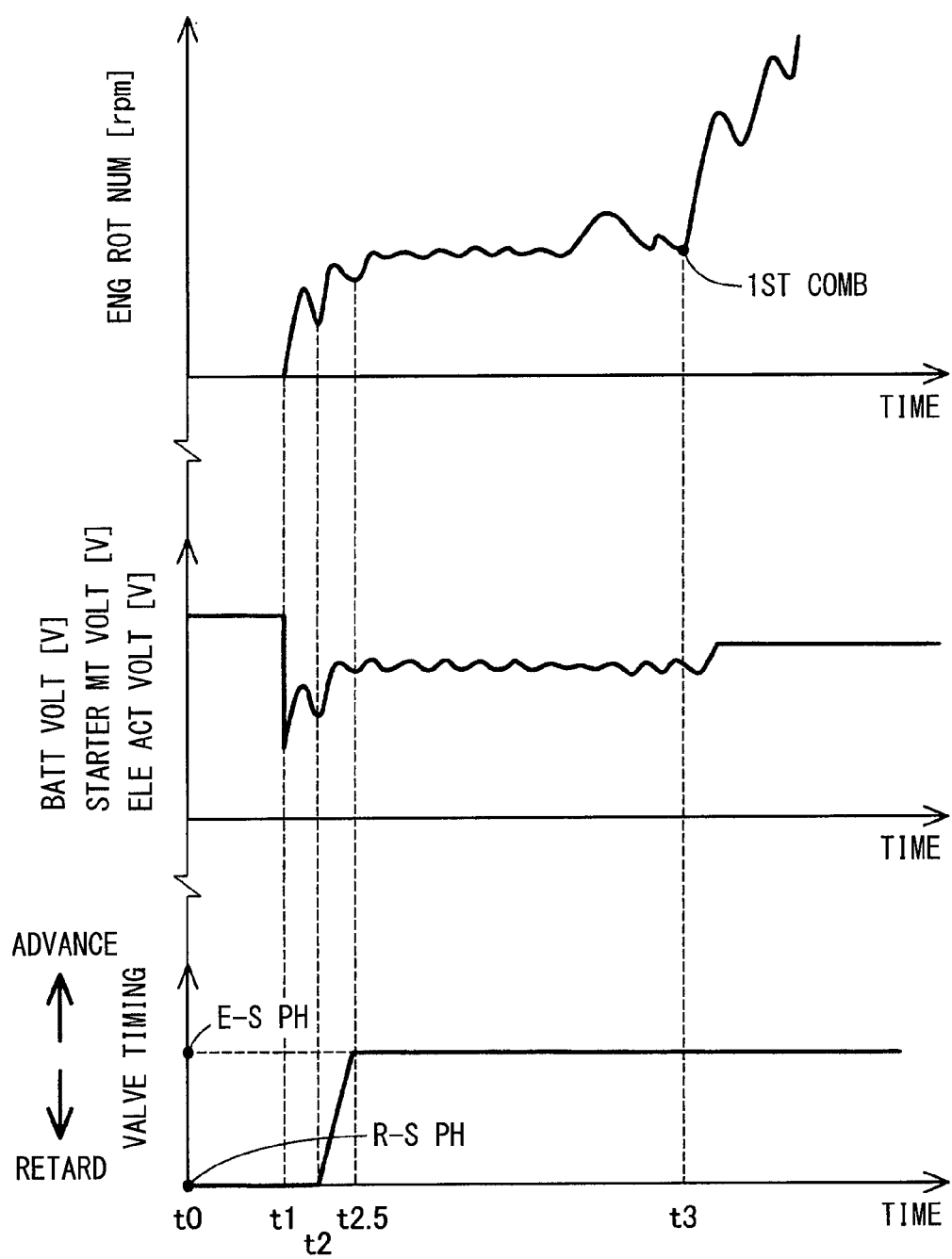
FIG. 8 is a timing chart of a relationship between an engine rotation number, a voltage and a valve timing in the second embodiment of the present disclosure.

In the timing chart shown in FIG. 8, the engine rotation number and the voltage applied to the terminal of the battery 40 are the same as the timing chart of the first embodiment shown in FIG. 5.

Time t2 indicates a timing when the first piston 13*a* of the first cylinder 11*a* passes the top dead center of the first compression process. Time t2.5 indicates a timing when the second piston 13*b* of the second cylinder 11*b* passes the top dead center of the first compression process.

In step S130*a*, the control section 56 of the present embodiment controls the valve timing to the engine started phase in a period from time t2 to time t2.5 by steeply increasing the voltage applied to the electric actuator 54. Note that, for example, the phase advancement may be started within a predetermined period from time t2, and the advancement may be performed (i.e., controlled) to finish before time t2.5 (i.e., within a period between time t2 and time t2.5) to have the engine started phase. After completion of step S130*a*, the process proceeds to step S140.

According to the valve timing controller 50 of the second embodiment described above, the same effects as the valve timing controller 50 of the first embodiment are obtainable. In addition, the valve timing is controlled to have the engine started phase before the top dead center passing timing of the second piston 13*b* in the second cylinder 11*b*, which is a cylinder performing the first compression process secondly after the start of rotation of the crankshaft 20 among the four cylinders 11. Therefore, in a most torque demanding period, the torque required for the first piston 13*a* in the passing of the top dead center in the first cylinder 11*a* is reducible. In addition, the second cylinder 11*b* which performs the compression process secondly among the four cylinders 11 being subject to less torque demand is controlled to have the engine started phase, thereby facilitating the combustion by having a higher compression ratio. Therefore, the torque reduction can be effectively enabled, for the further improvement of the phase change timing at the start time of the internal-combustion engine 10.

C. Third Embodiment

Figure 9:
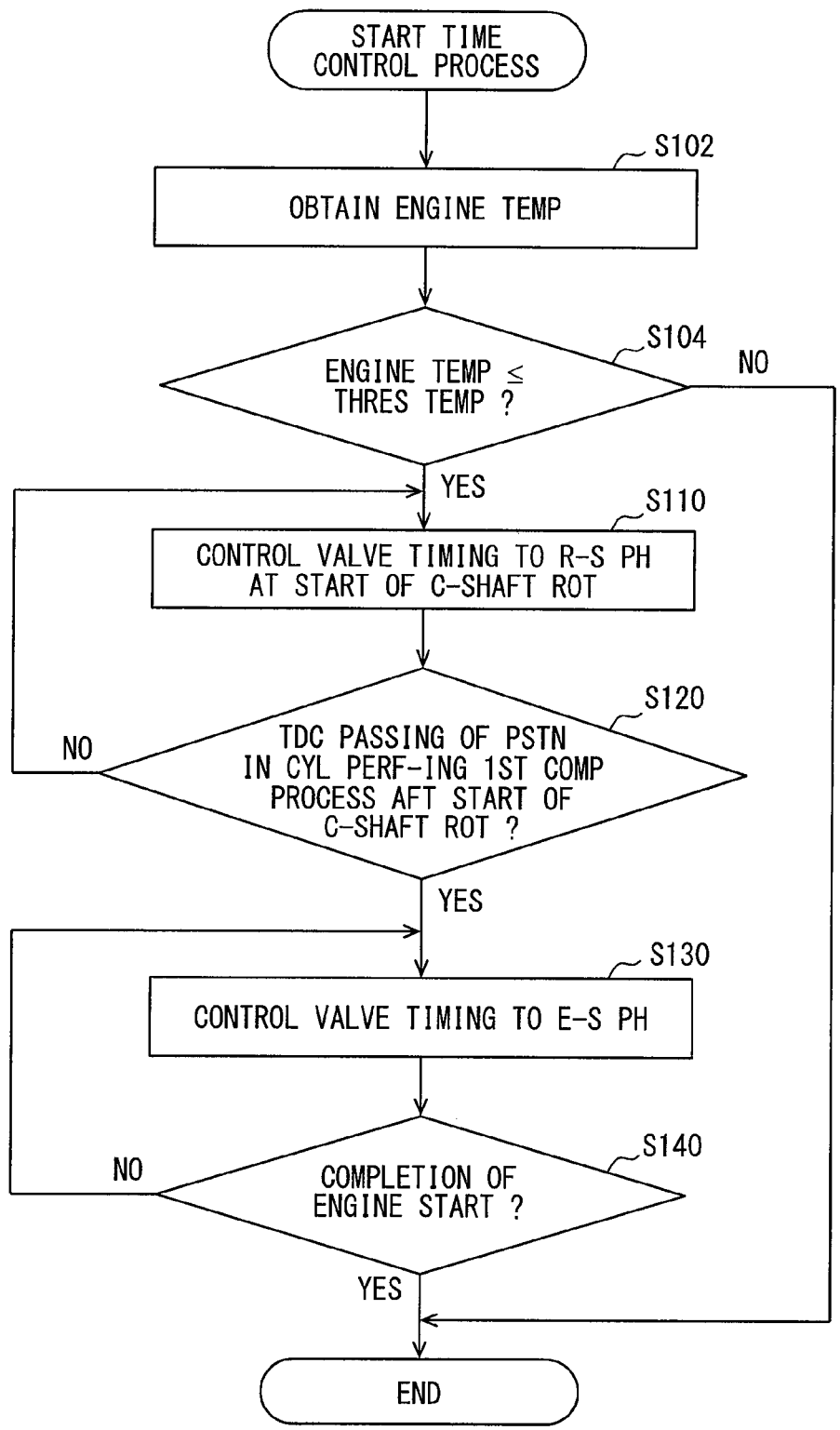
FIG. 9 is a flowchart of the procedure of the start time control process in a third embodiment of the present disclosure.

The start time control process performed by the valve timing controller 50 according to the third embodiment shown in FIG. 9 is characterized in that step S102 and step S104 are performed before step S110, which is different from the start time control process of the first embodiment. The other configuration including the device configuration is the same as that of the valve timing controller 50 of the first embodiment, thereby the same configuration has the same reference numeral and the detailed description thereof is omitted.

When the ignition switch 49 is turned ON to start the internal-combustion engine system 100, the control section 56 obtains temperature of the internal-combustion engine 10 (step S102). In the present embodiment, temperature detected by the cooling water temperature sensor 19 is obtained as temperature of the internal-combustion engine 10. The temperature of the internal-combustion engine 10 may be obtained not only by the cooling water temperature sensor 19 but, for example, by a temperature sensor or the like disposed in the combustion chamber 18.

The control section 56 determines whether or not the obtained temperature of the internal-combustion engine 10 is equal to or lower than a predetermined threshold temperature indicating a low temperature state (step S104). In the present embodiment, the threshold temperature is set to minus 20 degrees. The threshold temperature is not limited to minus 20° C., but may be set to any temperature indicating a low temperature state such as minus 10° C., 0° C., 10° C. or the like. The threshold temperature is preset and stored in the storage device of the electronic control unit 90.

When it is determined that the obtained temperature of the internal-combustion engine 10 is not equal to or below the threshold temperature (step S104: NO), that is, if it is determined that the threshold temperature is exceeded, the control section 56 ends the start time control process. Note that the control section 56 may perform a valve timing control processing set in advance according to the temperature of the internal-combustion engine 10 after the end of the start time control process.

When it is determined that the obtained temperature of the internal-combustion engine 10 is equal to or lower than the threshold temperature (step S104: YES), the process proceeds to step S110. As described above, in the second embodiment, when the obtained temperature of the internal-combustion engine 10 is equal to or lower than the predetermined threshold temperature indicating that the internal-combustion engine 10 is in the low temperature state, the same start time control process as the first embodiment is performed.

The reason for performing the same start time control process as that of the first embodiment when the internal-combustion engine 10 is in a low temperature state is described below. When the internal-combustion engine 10 is in a low temperature state, the viscosity of the engine oil lubricating the internal-combustion engine 10 is high, and the mechanical friction loss is particularly large. Thus, a particularly large torque is required to raise the piston 13 in the first compression process. In the present embodiment, the torque is effectively reduced by setting the valve timing at the start of the rotation of the crankshaft 20 as a phase close to the most retarded phase in the low temperature state. In addition, when the internal-combustion engine 10 is in a low temperature state, the viscosity of the engine oil lubricating the phase changer 52 is high, thereby the response speed of the phase changer 52 becomes low. Therefore, it may take time to change the valve timing. In addition, when the internal-combustion engine 10 is in a low temperature state, if the timing of change from the rotation starter phase to the engine started phase is too late, a sufficient compression ratio cannot be obtained and the startability of the internal-combustion engine 10 may deteriorate. Further, due to the low temperature in the combustion chamber 18, combustion does not easily occur even if the mixed gas is ignited. In the present embodiment, the deterioration of the startability of the internal-combustion engine 10 is prevented by controlling the valve timing to the engine started phase after passing of the top dead center with the piston 13 in the first compression process in the low temperature state.

According to the valve timing controller 50 of the third embodiment described above, the same effects as the valve timing controller 50 of the first embodiment are obtainable. In addition, when the temperature of the internal-combustion engine 10 is equal to or lower than a predetermined threshold temperature indicating that the internal-combustion engine 10 is in the low temperature state, the same start time control process as in the first embodiment is performed. Therefore, the torque in the low temperature state, in which the viscosity of the engine oil is high and the mechanical friction loss is particularly large, is effectively reduced. Further, control to the engine started phase is performed after passing the top dead center with the piston 13 in the first compression process that requires a particularly large torque, delay of the phase change timing for the change from the rotation starter phase to the engine started phase is preventable. Therefore, the compression ratio can be increased at a relatively early stage after the start of rotation of the crankshaft 20, and the deterioration of the startability of the internal-combustion engine 10 is prevented. Thus, it is possible to further prevent the deterioration of the startability while further reducing the torque required for the rotation of the crankshaft 20. That is, the phase change timing at the start time of the internal-combustion engine 10 can be further improved. Further, compared with the configuration in which the start time control process is always performed regardless of the temperature of the internal-combustion engine 10, the occurrence of knocking and the occurrence of self-ignition are preventable.

D. Other Embodiments (1) In the start time control process of each of the above-described embodiments, the rotation starter phase is set as a phase having an angle near the most retarded angle. However, the rotation starter phase may be set as an angle-advanced phase than the most retarded phase, at which torque reduction effects and the decompression effects are achievable. Further, when the ignition switch 49 is turned ON and the internal-combustion engine system 100 is started, the valve timing is controlled to be the rotation starter phase in the above-described embodiments. However, the phase changer 52 may be controlled to have a position that makes the valve timing correspond to the engine started phase before the ignition switch 49 is turned ON. Even in such a configuration, the same effects as those of the above embodiments are achievable.

(2) In the start time control process of each of the above-described embodiments, the second minimum value detection timing (i.e., the second detection timing of the minimum value) regarding the voltage applied to the terminal of the battery 40 is determined as the top dead center passing timing of the piston 13 of the cylinder 11 that is firstly performing the compression process. However, the present disclosure is not limited to such configuration. For example, the timing at which the second minimum value of the voltage applied to the terminal of the starter motor 25 may be determined as the top dead center passing timing, i.e., not necessarily the terminal of the battery 40. According to such configuration, a direct identification of the top dead center passing timing is enabled, thereby preventing the deterioration of detection accuracy of such timing. Further, for example, the timing at which the second minimum value of the voltage applied to the terminal of the electric actuator 54 of the valve timing controller 50 may also be determined as the top dead center passing timing. According to such configuration, a voltage monitored for the prevention of excessive current in the phase changer 52 is utilized, thereby complication of the device configuration is preventable. Further, for example, the timing at which the second minimum value of the voltage applied to a terminal of an optional accessory device mounted on the vehicle to which electric power is supplied from the battery 40 may be determined as the top dead center passing timing. In addition to the timing at which the second minimum value of the voltage is detected, for example, the timing at which a preset period has elapsed from (the detection of) the first minimum value, or the preset period from the first maximum value has elapsed therefrom may also be determined as the top dead center passing timing. That is, in general, the top dead center passing timing may be determined by using the value of the voltage applied to a terminal of at least one of the battery 40 supplying electric power to starter motor 25 and the device connected to battery 40. Even in such a configuration, the same effects as the above-described embodiments are achievable.

(3) In the start time control process of each of the above-described embodiments, the top dead center passing timing is determined by using the value of the voltage applied to the terminal of the battery 40. However, the present disclosure is not limited thereto. For example, the value of the electric current flowing through the starter motor 25 may be used to determine the top dead center passing timing. Further, for example, the top dead center passing timing may be determined based on a motor rotation signal that represents the actual rotation number or the actual rotation position of the electric actuator 54 that controls the phase changer 52. Even in such a configuration, the same effects as the above-described embodiments are achievable.

(4) In the start time control process of the first and third embodiments described above, the valve timing is controlled to the engine started phase in a period from the passing of the top dead center of the first compression process of the pistons 13 and 13a in the cylinders 11 and 11a firstly performing the compression process to the first combustion of the internal-combustion engine 10. However, the present disclosure is not limited thereto. For example, control to realize the engine started phase may be performed before a lapse of a preset period with reference to the top dead center passing timing of the first compression process of the pistons 13 and 13a in the cylinders 11 and 11a firstly performing the compression process among other cylinders 11. Further, for example, by determining a timing at which the top dead center of the first compression process is passed by the second piston 13b in the second cylinder 11b which is performing the second compression process, and the phase advancement may be started from such a timing to realize the engine started phase. For the determination of such a timing, a voltage value applied to the terminal of the battery 40 may be used, for example. Also, for example, control to realize the engine started phase may be performed before a timing at which the first combustion is started at least in two cylinders 11, or may also be performed before a timing of start of the combustion in all cylinders 11. That is, in general, the start time control process may control the valve timing to be set to the engine started phase that is advanced from the rotation starter phase in a period (i) from the top dead center passing timing in the first compression process with the piston 13 disposed in the cylinder 11 of the internal-combustion engine 10 after the start of the rotation of the crankshaft 20 (ii) to the completion of the start of the internal-combustion engine 10. Even in such a configuration, the same effects as the above-described embodiments are achievable.

(5) The valve timing controller 50 according to each of the above embodiments is applicable to the in-line four-cylinder internal-combustion engine 10, but may be applied to, for example, an in-line six-cylinder internal-combustion engine or a V-type internal-combustion engine, or may even be applied to a single cylinder internal-combustion engine. Further, the present disclosure is not limited to the intake port injection type engine, but may be applied to a cylinder injection type internal-combustion engine. Moreover, although the control section 56 of the valve timing controller 50 is provided as a part of the electronic control unit 90 with which the internal-combustion engine system 100 is provided, the control section 56 may be provided as a different ECU other than the electronic control unit 90. Even in such a configuration, the same effects as those of the above embodiments are achievable.

The present disclosure is not limited to the above-described embodiments, but can be implemented with various modifications without departing from the scope of the present disclosure. For example, the technical features described in the embodiments corresponding to the technical features in the modes described in the summary section of the present disclosure can be arbitrarily replaced or combined with other features for solving all or part of the problem described above and/or for achieving all or part of the effects described above. Also, if the technical features are not described as essential in the present disclosure, they can be deleted as appropriate.

The controller described in the present disclosure and the method thereof may be realized by a dedicated computer provided by configuring a processor and a memory programmed to perform one or more functions realizable by an execution of a computer program. Alternatively, the controller described in the present disclosure and the method thereof may be realized by a dedicated computer provided by configuring a processor with one or more dedicated hardware logic circuits. Alternatively, the controller and the method described in the present disclosure may be realized by one or more dedicated computers which may be a combination of (i) a processor and a memory programmed to perform one or more functions and (ii) a processor configured by one or more hardware logic circuits. The computer program may also be stored in a computer readable non-transition tangible storage medium as computer-executable instructions.

What is claimed is:

1. A valve timing controller for controlling a valve timing of an intake valve that opens and closes by a rotation of a camshaft to which a power is supplied from a crankshaft of an internal-combustion engine, the valve timing controller comprising:

a phase changer configured to change a rotation phase of the camshaft relative to the crankshaft for an adjustment of the valve timing;

an electric actuator configured to drive the phase changer; and a control section configured to control an operation of the electric actuator, wherein the control section performs a start time control process, controlling the valve timing to a rotation starter phase that is set as retarded from a preset reference phase at a start of crankshaft rotation, and controlling the valve timing to an engine started phase that is set as advanced from the rotation starter phase after a passing of a top dead center in a first compression process by a piston in a cylinder after the start of crankshaft rotation and before completion of engine start, and the start of the crankshaft rotation occurs at a first time of a voltage drop to a first local minimum of a voltage applied to at least one of: a better terminal, a starter motor, and the electric actuator.

2. The valve timing controller of claim 1, wherein
the control section obtains temperature of the internal-combustion engine, and performs the star time control process when the obtained temperature is equal to or lower than a predetermined threshold temperature indicative of a low temperature state.

3. The valve timing controller of claim 1, wherein
the rotation starter phase is set as a phase having an angle close to a most retarded angle.

4. The valve timing controller of claim 1, wherein
the control section identifies, in the start time control process, a top dead center passing timing by utilizing a voltage value that is applied to a terminal of at least one of a battery that supplies electric power to the starter motor and a device connected to the battery.

5. The valve timing controller of claim 4, wherein
the terminal of at least one of the battery and the device is a terminal of the electric actuator.

6. The valve timing controller of claim 4, wherein
the terminal of at least one of the battery and the device is a terminal of the starter motor.

7. The valve timing controller of claim 4, wherein
the control section identifies, as the top dead center passing timing, a timing of detecting a minimum voltage value for a second time in the start time control process.

8. The valve timing controller of claim 1, wherein
the control section controls, in the start time control process, the valve timing to the engine started phase during a period between (i) a first piston top dead center passing timing, which is a timing at which a first piston of a first cylinder that firstly performs the first compression process among a plurality of cylinders in the internal-combustion engine after the start of crankshaft rotation passes the top dead center of the first compression process, and (ii) a second piston top dead center passing timing at which a second piston of a second cylinder that secondly performs the first compression process among the plurality of cylinders in the internal-combustion engine after the start of crankshaft rotation passes the top dead center of the first compression process.

9. A method for controlling a valve timing of an intake valve that opens and closes by a rotation of a camshaft to which a power is transmitted from a crankshaft in an internal-combustion engine, the control of the valve timing performed by controlling an operation of an electric actuator driving a phase changer that is capable of changing a rotation phase of the camshaft relative to the crankshaft, the method comprising:
controlling the valve timing to a rotation starter phase that is set as retarded from a reference phase at a start of crankshaft rotation; and
controlling the valve timing to an engine started phase that is set as advanced from the rotation starter phase after a passing of a top dead center in a first compression process by a piston in a cylinder after the start of crankshaft rotation and before completion of engine start, wherein
the start of the crankshaft rotation occurs at a first time of a voltage drop to a first local minimum of a voltage applied to at least one of: a battery terminal, a starter motor, and the electric actuator.

10. A valve timing controller comprising:
a phase changer;
an electric actuator; and
a control section wherein the control section is configured to:
control a valve timing to a rotation starter phase at a start of a crankshaft rotation near a first local minimum of a voltage at a first time,
determine that a first cylinder has passed a top dead center of a first compression process by identifying a second local minimum of the voltage at a second time,
control the valve timing to an engine started phase that is advanced relative to the rotation starter phase.

11. The valve timing controller of claim 10,
wherein controlling the valve timing to an engine started phase includes substantially linearly increasing the valve timing from the rotation starter phase at the second time until a third time.

12. The valve timing controller of claim 11,
wherein the controlling the valve timing includes a normal control beginning after a first combustion of a motor, upon a determination that an engine start is completed.

* * * * *